US010417398B2

(12) United States Patent
Lewis et al.

(10) Patent No.: US 10,417,398 B2
(45) Date of Patent: Sep. 17, 2019

(54) RESTRICTED AND UNRESTRICTED STATES FOR CONTENT BASED ON INSTALLATION STATUS OF APPLICATIONS

(71) Applicant: Google Inc., Mountain View, CA (US)

(72) Inventors: Justin Lewis, Marina Del Rey, CA (US); Richard Rapp, Marina Del Rey, CA (US)

(73) Assignee: Google LLC, Mountain View, CA (US)

( * ) Notice: Subject to any disclaimer, the term of this patent is extended or adjusted under 35 U.S.C. 154(b) by 133 days.

(21) Appl. No.: 15/715,682

(22) Filed: Sep. 26, 2017

(65) Prior Publication Data
US 2018/0181728 A1    Jun. 28, 2018

Related U.S. Application Data

(60) Provisional application No. 62/439,880, filed on Dec. 28, 2016.

(51) Int. Cl.
*G06F 21/00*     (2013.01)
*H04L 29/06*     (2006.01)
(Continued)

(52) U.S. Cl.
CPC ............ *G06F 21/128* (2013.01); *G06F 16/40* (2019.01); *G06F 21/105* (2013.01);
(Continued)

(58) Field of Classification Search
CPC ...... G06F 21/128; G06F 16/40; G06F 21/105; G06Q 30/02; G06Q 20/1235;
(Continued)

(56) References Cited

U.S. PATENT DOCUMENTS 9,426,143 B2    8/2016   Patel
9,462,342 B2    10/2016  Krishnamurthy
(Continued)

OTHER PUBLICATIONS

PCT Notification of Transmittal of the International Search Report and the Written Opinion of the International Searching Authority for PCT Application No. PCT/US2017/053780, dated Jan. 4, 2018, 13 pages.

*Primary Examiner* — Lisa C Lewis
(74) *Attorney, Agent, or Firm* — Lowenstein Sandler LLP (57) ABSTRACT

Implementations disclose restricted and unrestricted states for content based on installation status of applications. A method includes receiving, by a first content platform, a request to access content via a first application executing on a client device, the first application being associated with the first content platform, determining that the first application is in an unrestricted state based on an ephermal state machine of the server device, determining an install state of a second application on the client device, the second application being associated with a second content platform, responsive to determining that the install state of the second application is uninstalled, providing the content via the first application in the unrestricted state, and responsive to determining that the install state of the second application is installed, transferring the first application to a restricted state, and providing the content via the first application in a restricted state.

24 Claims, 6 Drawing Sheets

(51) Int. Cl.
*G06F 21/12* (2013.01)
*G06F 21/10* (2013.01)
*H04L 29/08* (2006.01)
*G06Q 20/12* (2012.01)
*G06Q 30/02* (2012.01)
*G06F 16/40* (2019.01)
G06Q 30/06 (2012.01)

(52) U.S. Cl.
CPC ......... *G06Q 20/1235* (2013.01); *G06Q 30/02* (2013.01); *H04L 63/108* (2013.01); *H04L 67/34* (2013.01); *G06Q 30/0607* (2013.01); *H04L 2463/102* (2013.01)

(58) Field of Classification Search
CPC ... G06Q 30/0607; H04L 67/34; H04L 63/108; H04L 2463/102
See application file for complete search history.

(56) References Cited

U.S. PATENT DOCUMENTS

| | | |
|---|---|---|
| 2005/0060571 A1 | 3/2005 | Wang et al. |
| 2006/0123117 A1* | 6/2006 | Heutchy ................. G06F 21/10 709/227 |
| 2007/0162395 A1 | 7/2007 | Ben-Yaacov et al. |
| 2009/0113532 A1* | 4/2009 | Lapidous ................ G06F 21/10 726/7 |
| 2010/0114739 A1 | 5/2010 | Johnston |
| 2013/0219381 A1 | 8/2013 | Lovitt |
| 2016/0005077 A1* | 1/2016 | McDevitt ........... G06Q 30/0208 705/14.58 |

* cited by examiner

RESTRICTED AND UNRESTRICTED STATES FOR CONTENT BASED ON INSTALLATION STATUS OF APPLICATIONS

RELATED APPLICATIONS

This application claims the benefit of a provisional U.S. Patent Application No. 62/439,880 filed on Dec. 28, 2016, the entire content of which is incorporated by reference herein.

TECHNICAL FIELD

This disclosure relates to the field of content sharing platforms and, in particular, to restricted and unrestricted states for content based on installation status of applications.

BACKGROUND

Content-sharing platforms and their corresponding websites and mobile applications ("apps") allow users to play and watch music and videos. Content sharing platforms may utilize a subscription-based model for users of the content sharing platform. A subscription-based model refers to a user paying a fee (one-time, periodic, etc.) in order to utilize "premium" services of the content sharing platform. The premium services may refer to advertisement-free use of the primary application, access to premium content of the content sharing platform, background playback of content, offline mode, and so on. Attempts to grow a user base of a content sharing platform have focused on advertising, promotional pricing, free trials, improved/expanded content libraries, and so on. However, it remains difficult to facilitate the changing of users to a new service (e.g., a new content sharing platform service).

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes receiving, by a processing device of a server device of a first content platform, a request to access content via a first application executing on a client device, the first application being associated with the first content platform, determining that the first application is in an unrestricted state based on an ephermal state machine of the server device, determining an install state of a second application on the client device, the second application being associated with a second content platform, responsive to determining that the install state of the second application is uninstalled, providing the content via the first application in the unrestricted state, and responsive to determining that the install state of the second application is installed, transferring the first application to a restricted state, and providing the content via the first application in a restricted state.

In one implementation, the unrestricted state includes an extended free trial period. Furthermore, the unrestricted state may include a free trial period. In addition, the ephermal state machine may determine that the first application is in the unrestricted state based on a comparison of a start time and an end time of a trial subscription with a current time of the request.

In some implementations, the start time and the end time of the trial description are configured in a trial description object. In one implementation, the install state of the second application is provided by the client device to the server device based on a list of secondary applications provided to the client device. In addition, the list of secondary application can be configured in a trial description object. Furthermore, the install state may be based on assessing a capability of the client device to handle Uniform Resource Locator (URL) schemes associated with the list of secondary applications.

In one implementation, the install state is based on assessing application intents of the client device with respect to the list of secondary applications. Additionally, the unrestricted state may include access to premium services of the first application, and the restricted state may include denial of access to the premium services of the first application.

Computing devices for performing the operations of the above described method and the various implementations described herein are disclosed. Computer-readable media that store instructions for performing operations associated with the above described method and the various implementations described herein are also disclosed.

BRIEF DESCRIPTION OF THE DRAWINGS

The present disclosure is illustrated by way of example, and not by way of limitation, in the figures of the accompanying drawings.

DETAILED DESCRIPTION

Aspects and implementations of the disclosure are directed to restricted and unrestricted states for content based on installation status of applications. Content sharing platforms may utilize a subscription-based model for users of the content sharing platform. A subscription-based model refers to a user paying a fee (one-time, periodic, etc.) in order to utilize "premium" services of an application (e.g., primary application, first application, etc.) of the content sharing platform. The premium services may refer to services that provide additional features that are not otherwise provided by regular services. Examples of such additional features may include advertisement-free use of the application, access to premium (e.g., higher quality and/or more desirable) content of the content sharing platform, background playback of content (e.g., streaming playback of content while application is executing in the background (not current focus) of client device), offline mode, and so on.

Attempts to grow a user base of a content sharing platform have focused on reduced advertising, promotional pricing, free trials, improved/expanded content libraries, and so on. However, it remains difficult to facilitate or incentivize new users to change to a new service (e.g., a new content sharing platform service). Conventionally, users may already have automatic billing set up for services (such as a content sharing platform), and may use the services that are most familiar, even if access is provided to other services.

Implementations of the disclosure provide for a system of server and client-side components utilized to facilitate the change or switch of a user to a new subscription service (or, in some cases, facilitate the retention of a user at a subscription service) via providing restricted and unrestricted states for content based on installation status of applications. The description herein refers to a content sharing platform as a specific example of a service. However, implementations of the disclosure may be similarly applicable to other types of services (also referred to as subscription services) available to a user. Furthermore, in the description herein, an unrestricted state may refer to unrestricted access to premium services (e.g., trial subscription in place), while a restricted state may refer to restricted or denied access to premium services (e.g., partial trial subscription or no trial subscription in place).

In one implementation, server and client-side components are provided to implement an ephermal (e.g., transient, transitory, short-lived, etc.) state machine to specify a state (i.e., restricted, unrestricted) associated with a trial subscription (also referred to herein as a "trial"). The trial subscription state may be based on an installation state of an application on a client device of the user. For example, the trial subscription state for a content sharing platform application on a client device of a user may be dependent on whether other applications for other content sharing platforms are installed on the client device.

In implementations of the disclosure, the trial subscription may initially provide access to premium services of the primary application without qualification during a first time period (i.e., unrestricted trial subscription state). Once the first time period expires, the trial subscription may continue for a second time period (i.e., restricted trial subscription state), as long as one or more secondary applications (also referred to herein as second applications) of other content sharing platforms (referred to herein as a secondary content sharing platforms) are uninstalled on the client device of the user associated with the trial subscription. The duration of the first and second time periods may vary and, in some cases, may be indefinite.

Conventional systems for trial subscriptions for content sharing platforms do not provide for a combination of server-side and client-side components to implement the trial. For example, conventional systems may govern whether or not a user is eligible for premium services of an application via a trial using solely server-side functionality without receiving the most up-to-date information regarding the client device from the client device. Implementations of the disclosure provide for a combination of an ephemeral state machine and application installation detection to provide a trial subscription that incentivizes (or facilitates) users to switch subscription services. This combination is realized via server and client-side processes, which results in the most accurate and up-to-date user state information for the trial subscription.

Furthermore, a state of a trial subscription (restricted vs. unrestricted) for a user may be dependent on which client device (of the user) is requesting services covered by the trial. For example, during a trial, the user may have access to premium features of a first application (e.g., no ads, background playback, offline mode, etc.) on a first client device if a second application is not installed on the first client device. However, the user may not have access to the same premium feature(s) of the first application on a second client device of the user if the second application is installed on the second client device. Implementations of the disclosure provide an improvement to the conventional systems by positively impacting user retention for a content sharing platform and by impacting conversion of users to utilize the content sharing platform as a primary service. User retention and conversion of users are improved by incentivizing users to adopt the content sharing platform as a primary service by reinforcing the primary use of the content sharing platform by the users.

Implementations of the disclosure often reference videos for simplicity and brevity. However, the teaching of the present disclosure are applied to media items generally and can be applied to various types of content or media items, including for example, video, audio, text, images, program instructions, etc.

Figure 1:
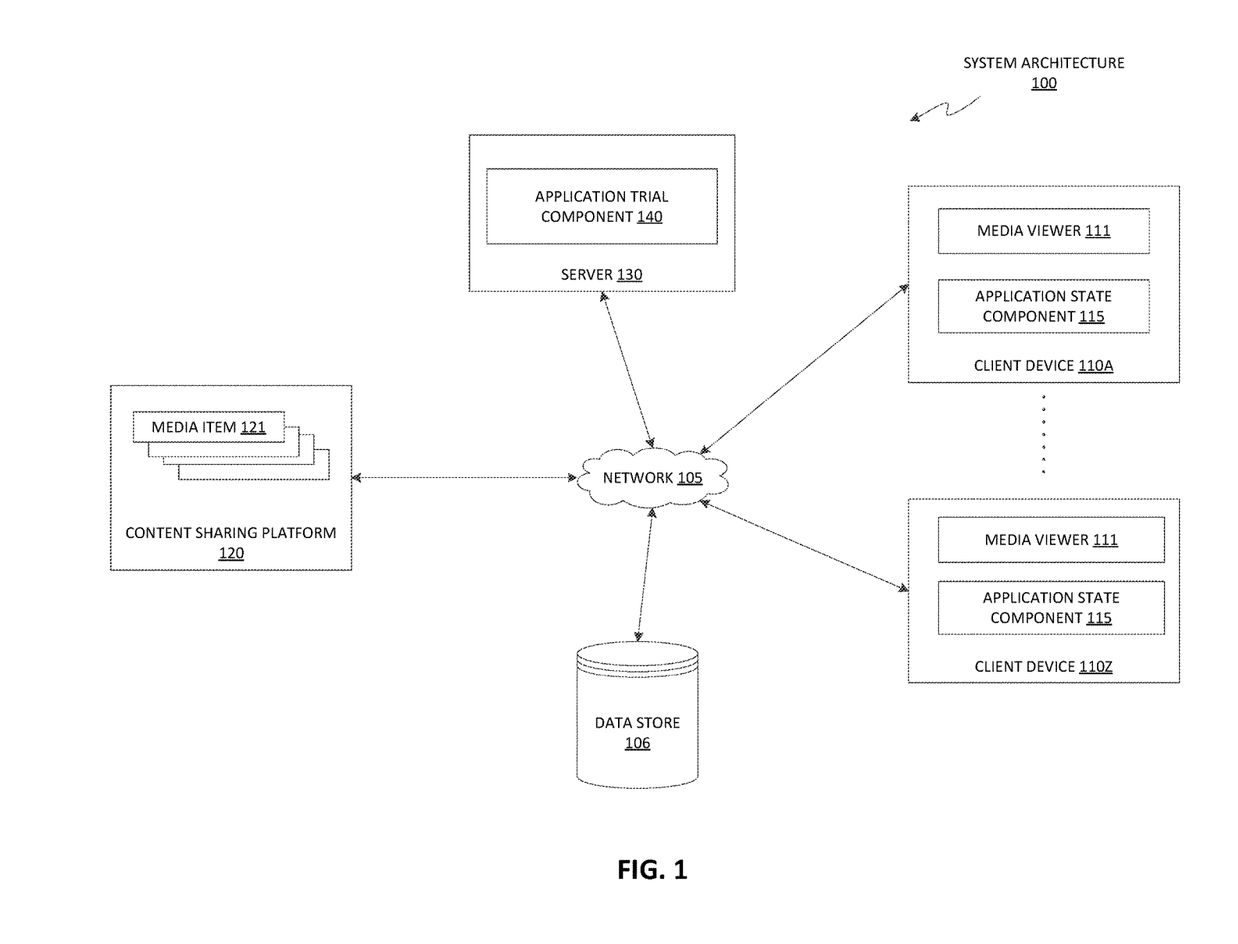
FIG. 1 is a block diagram illustrating an exemplary network architecture in which implementations of the disclosure may be implemented.

FIG. 1 illustrates an example system architecture 100, in accordance with one implementation of the disclosure. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers, network-connected televisions, etc. In some implementations, client device 110A through 110Z may also be referred to as "user devices." Each client device includes a media viewer 111. In one implementation, the media viewer 111 is a primary application. The media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application (e.g., a mobile application or app) that allows users to view digital media items (e.g., digital videos, digital images, electronic books, etc.). According to aspects of the disclosure, the media viewer 111 may be a content sharing platform application for users to record, edit, and/or upload content for sharing on the content sharing platform, and implements a handoff feature for the content sharing platform.

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

Functions described in one implementation as being performed by the content sharing platform 120 can also be performed on the client devices 110A through 110Z in other implementations, if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or comment on media items. The content sharing platform 120 may also include a website (e.g., a webpage) or application back-end software that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 may host data content, such as media items 121. The data content can be digital content chosen by a user, digital content made available by a user, digital content uploaded by a user, digital content chosen by a content provider, digital content chosen by a broadcaster, etc. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as a content item.

A media item 121 may be consumed via the Internet and/or via a mobile device application. For brevity and simplicity, an online video (also hereinafter referred to as a video) is used as an example of a media item 121 throughout this document. As used herein, "media," "media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106.

In one implementation, the server 130 may be one or more computing devices (e.g., a rackmount server, a server computer, etc.). In one implementation, the server 130 may be included in the content sharing platform 120. The server 130 may include an application trial component 140 to implement a system to incentivize users of a content sharing platform 120 to switch subscription services. In some implementations, client device 110A-110Z may include an application state component 115 that works in conjunction with (or in some implementations, works independently of) application trial component 140 to implement incentivizing users of the content sharing platform 120 to switch subscription services. Application state component 115 may perform implementations of the disclosure independently of application trial component 140 of server 130, or may work in conjunction with application trial component 140. Although the following description may refer to application trial component 140 performing implementations of the disclosure, it should be understood that the functionality of application trial component 140 may be similarly performed solely by, and/or in conjunction with, application state component 115 at client device 110A-110Z.

In one implementation, the application trial component 140 and the application state component 115 operate in tandem to enable incentivizing users of a content sharing platform to switch subscriptions services. In one implementation, the subscription services are music streaming services, and the applications (primary and secondary) are music streaming services applications that provide music content as part of the music streaming service. A trial subscription (e.g., free to the user) can be offered by the content sharing platform 120, where the trial subscription is associated with premium services provided via an application of the content sharing platform. This application may be referred to herein as a primary application or as a first application. In addition, the content sharing platform 120 offering the trial subscription for the primary application may be referred to herein as the primary content sharing platform. The premium services may refer to advertisement-free use of the primary application, access to premium content of the content sharing platform, background playback of content, offline mode, and so on.

In implementations of the disclosure, the trial subscription may initially provide access to premium services of the primary application without qualification during a first time period. Once the first time period expires, the trial subscription may continue for a second time period as long as one or more secondary applications (also referred to herein as second applications) of other content sharing platforms (referred to herein as a secondary content sharing platforms) are uninstalled on the client device of the user associated with the trial subscription. The duration of the first and second time periods may vary and, in some cases, may be indefinite.

In some implementations, application trial component 140 of server 130 may interact with content sharing platform 120 to provide implementations of the disclosure. Further description of the application trial component 140 and the application state component 115, as well as their specific functions, are described in more detail below with respect to FIG. 2.

Although implementations of the disclosure are discussed in terms of content sharing platforms and providing a handoff feature for the content sharing platform, implementations may also be generally applied to any type of social network providing connections between users. Implementations of the disclosure are not limited to content sharing platforms that provide channel subscriptions to users.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 2:
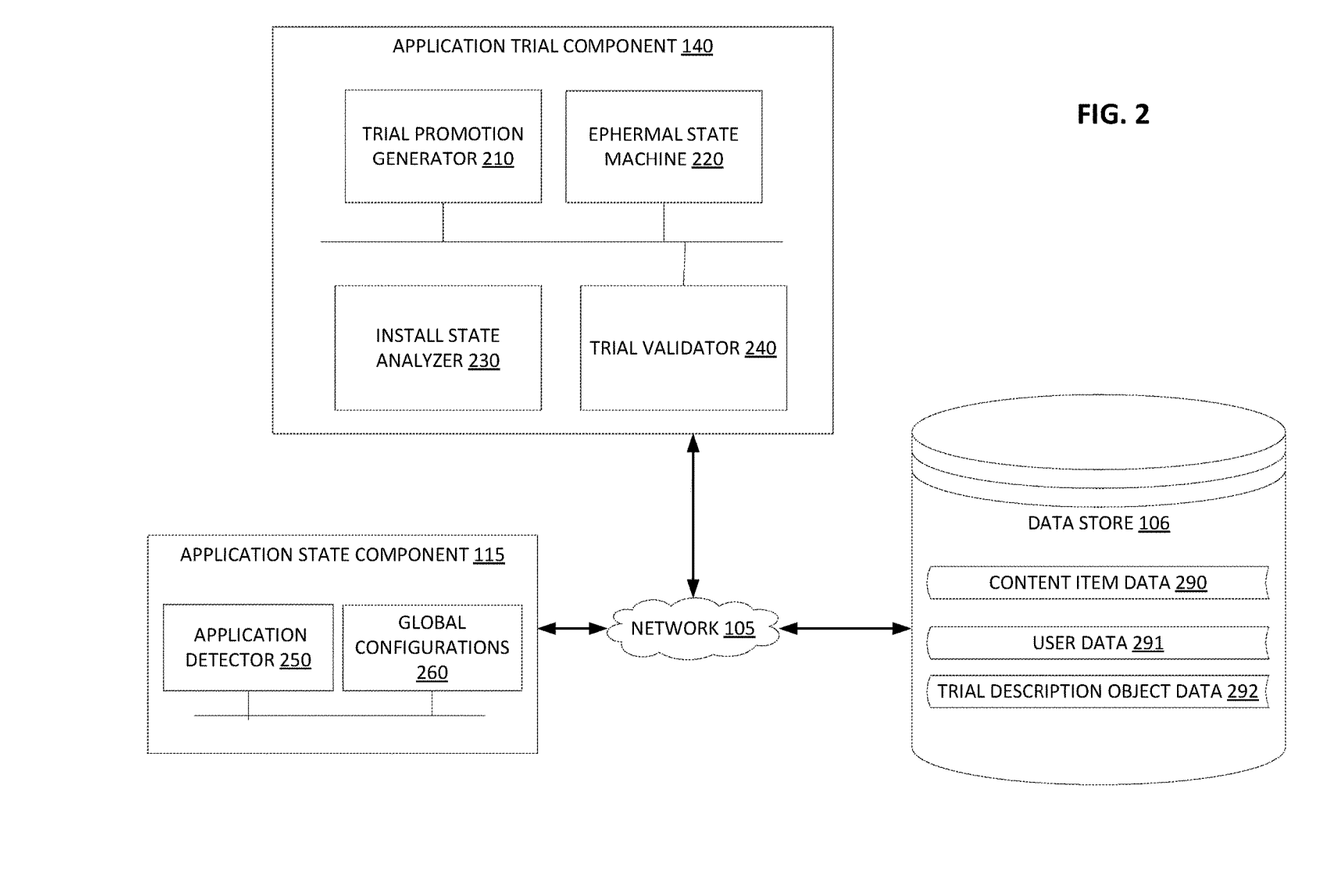
FIG. 2 is a block diagram of an application state component and an application trial component, in accordance with an implementation of the disclosure.

FIG. 2 is a block diagram illustrating application trial component 140 and application state component 115 in accordance with one implementation of the disclosure. As discussed above, the application trial component 140 may interact with a single social network, or may be utilized among multiple social networks (e.g., provided as a service of a content sharing platform that is utilized by other third party social networks). In one implementation, the application trial component 140 includes a trial promotion generator 210, an ephermal state machine 220, an install state analyzer 230, and a trial validator 240. More or less components may be included in the application trial component 140 without loss of generality. For example, two of the modules may be combined into a single module, or one of the modules may be divided into two or more modules. In one implementation, one or more of the modules may reside on different computing devices (e.g., different server computers, on a single client device, or distributed among multiple client devices, etc.). Furthermore, one or more of the modules may reside on different content sharing platforms, third party social networks, and/or external servers.

The application trial component 140 is communicatively coupled to the application state component 115 and the data store 106. For example, the application trial component 140 may be coupled to application state component 115 and the data store 106 via a network (e.g., via network 105 as illustrated in FIG. 1).

In one implementation, the application state component 115 includes an application detector 250 and global configurations 260. More or less components may be included in the application state component 115 without loss of generality. For example, two of the modules may be combined into a single module, or one of the modules may be divided into two or more modules. In one implementation, one or more of the modules may reside on different computing devices (e.g., different server computers, on a single client device, or distributed among multiple client devices, etc.). Furthermore, one or more of the modules may reside on different content sharing platforms, third party social networks, and/or external servers.

The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 includes content item data 290, user data 291, and trial description object data 292.

As discussed above, the application trial component 140 and the application state component 115, individually and/or in combination, enable incentivizing users of a content sharing platform to switch subscriptions services. In one implementation, a trial subscription (e.g., free to the user) is offered by a content sharing platform, where the trial subscription is associated with premium services provided via an application of the content sharing platform. This application may be referred to herein as a primary application. In addition, the content sharing platform offering the trial subscription for the primary application may be referred to herein as the primary content sharing platform. The premium services may refer to advertisement-free use of the primary application, access to premium content of the content sharing platform, background playback of content, offline mode, and so on.

In implementations of the disclosure, the trial subscription may initially provide access to premium services of the primary application without qualification during a first time period. Once the first time period expires, the trial subscription may continue for a second time period as long as one or more secondary applications of other content sharing platforms (referred to herein as secondary content sharing platforms) are uninstalled on the client device of the user associated with the trial subscription. The duration of the first and second time periods may vary and, in some cases, may be indefinite. In one implementation, in order to begin a trial subscription, a notification e.g., a promotion) for the trial subscription may be generated by trial promotion generator 210 and provided to the client device for display to a user of the client device.

Figure 3:
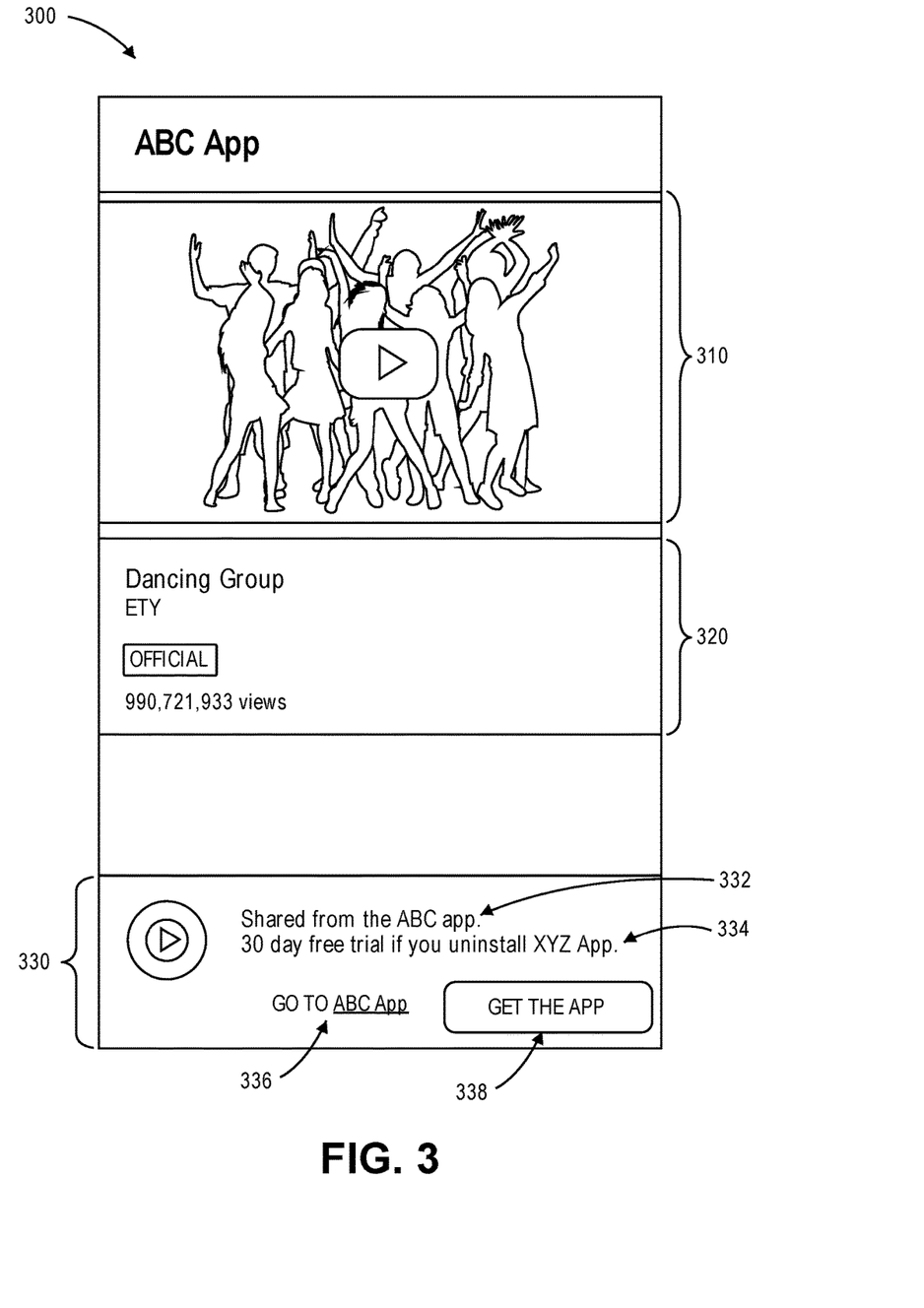
FIG. 3 is an exemplary screenshot of a UI for a promotion of an extended free trial for subscription services of a content sharing platform, according to implementations of the disclosure.

FIG. 3 depicts an example screenshot of a trial promotion UI 300 for incentivizing users of a content sharing platform to switch subscription services according to implementations of the disclosure. UI 300 may include a playback portion 310 to provide for playback of a content item (e.g., obtained from content item data 290 of data store 106). UI 300 may also include a content item description portion 320 including identifying information (e.g., obtained from content item data 290) that corresponds to a content item being provided for playback in the playback portion 310. UI 300 may further include a trial promotion portion 330.

In some implementations, the trial promotion portion 330 may include text describing an option for a user to participate in a trial for a primary application (i.e., "ABC App" in UI 300) 332 of a primary content sharing platform. The text also describes the condition for participation in the promoted trial, namely that a secondary application (i.e., "XYZ App" in UI 300) 334 of a secondary content sharing platform is uninstalled from the client device displaying the UI 300. UI 300 includes a link 336 (e.g., HyperText Transport Protocol (HTTP) link, hyperlink, etc.) to access further information on the primary application, as well as a button 338 to indicate acceptance of the trial promotion 330.

Referring back to FIG. 2, once an indication of acceptance of the promotion (e.g., by the user of the client device) is received by the application trial component 140, the application trial component may continue to manage the trial period of the trial subscription, as discussed further below.

An ephermal state machine 220 of application trial component 140 governs the length of the trial subscription. A state machine, such as ephermal state machine 220, refers to a device (e.g., logical device, hardware device, some combination of logic and hardware device, etc.) that can be in one of a finite number of states (e.g., a condition) depending on a previous state and on current values of inputs to the state machine. The ephermal state machine 220 of application trial component 140 stores specific start and end times for a trial associated with a user of the primary content sharing platform (of the primary application), and then compares a current time against the stored start and end times to determine a state of the trial of the user.

In implementations of the disclosure, there are two states (corresponding to a trial subscription) that the ephermal state machine 220 may be in with respect to accessing the premium features of the primary application. The first state may include a free trial state where the user can access, without qualification, the premium features of the primary application installed on a client device of the user. The second state may include an extended free trial state where the user can access the premium features of the primary application when a secondary application of a secondary content sharing platform is uninstalled on the client device of the user. In addition, the ephermal state machine 220 may indicate that the client device is in a no trial state. In some implementations, the free trial state and/or the extended free trial state may be referred to herein as an unrestricted state (e.g., referring to unrestricted access to premium services), while the no trial state may be referred to as a restricted state (e.g., referring to restricted or denied access to premium services).

An install state analyzer 230 of application trial component 140 may receive an install state of the client device of the user and also determine when the install state of the client device changes. The install state of the client device may be received from application state component 115. An application detector 250 of application state component 115 detects whether or not specific applications (i.e., secondary applications) are installed on the client device of the user. The set of secondary applications that are checked for by the application detector 250 may be provided to the application state component 115 by the application trial component 140 in the form of global configurations 260. The global configurations 260 may be part of a trial description object that describes the time period of the trial and the conditions under which the trial is valid. One of these conditions can be a list of applications (secondary applications) that should be uninstalled on the client device in order for the trial to be valid. This list of application can be stored by application state component 115 as global configurations 260. In one implementation, the trial description object is stored in trial description object data 292 of data store 106.

The global configurations 260 allow the application state component 115 to add and remove secondary applications to check for. In one implementation, the application detector 250 may check for a capability to handle specific Uniform Resource Locator (URL) schemes in order to determine whether one of the secondary applications in the global configurations 260 is installed. In another implementation, the application detector may consult application intents to determine whether one of the secondary applications in the global configurations 260 is installed. An application intent may provide for performing late runtime binding between code (instructions executable by a processing device) in different applications. An application intent may be utilized in the launching of activities, and may be described as a passive data structure holding an abstract description of an action to be performed.

As discussed above, the application detector 250 provides the determined install state to the install state analyzer 230. The install state analyzer 230 may store the received install state of the client device locally at a server device of the application trial component 140 (e.g., as part of user data 291 of data store 106).

The install state analyzer 230 may periodically invoke the application detector 250 in order to receive an install state of the client device of the user, and record the result. In one implementation, the result may be recorded in user data 291 of data store 106. In some implementations, the install state analyzer 230 is invoked when the primary application is started on the client device or when the user signs into the primary application or the primary content sharing platform via the client device. The install state analyzer 230 may also be manually-invoked via a dialog.

A trial validator 240 may receive a service request from the primary application on the client device, and utilize the ephermal state machine 220 and the application install state (as provided by application detector 250 and/or stored locally server-side by install state analyzer 230) to determine whether the primary application (and its associated user) is a candidate for the trial subscription. In one implementation, the service request may include the install state of the client device (as determined client-side by application detector 250).

The trial validator may first consult the ephermal state machine 220 to identify a current state of the trial for the client device (e.g., free trial state, extended trial state, no trial state). If the ephermal state machine 220 indicates that the client device is in an extended trial state, then trial validator 240 compares the received install state (or a cached install state) of the client device to the list of secondary applications of the trial description object (e.g., as obtained from trial description object data 292) to determine whether the secondary application(s) are uninstalled on the client device. If the secondary application(s) are uninstalled, then the application trial component 140 may indicate (e.g., to another server-side component responding to a content request from the primary application) that the premium services can be provided via the primary application (e.g., provide instructions to access premium services, allow the premium services to be provided, etc.). If the secondary application(s) are installed on the client device, then the application trial component may indicate that non-premium services can accessed via the primary application, while premium services cannot be accessed via the primary application.

Implementations of the disclosure allow for trial periods for subscription services to be on a per-client device basis. As such, a user may be in different states of a trial subscription depending on the client device on which the user accesses the primary application.

In one implementation of the disclosure, instead of restricting the trial to be based on whether the secondary applications are uninstalled, the trial may be restricted based on whether the secondary applications are installed.

Figure 4:
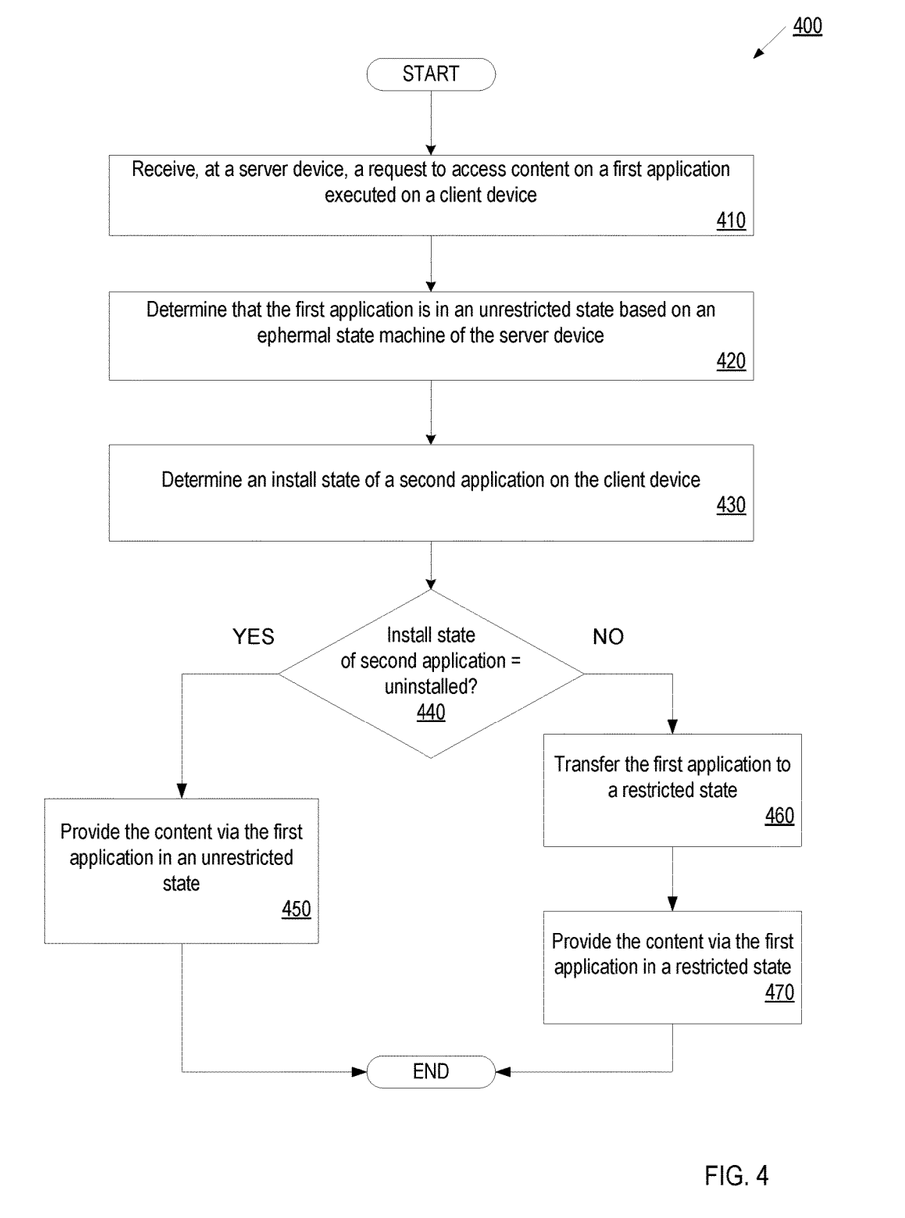
FIG. 4 is a flow diagram illustrating a method for facilitating changing of subscription services, according to an implementation.

FIG. 4 is a flow diagram illustrating a method 400 for facilitating changing of subscription services, according to an implementation of the present disclosure. The method 400 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art should understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by *** as shown in FIGS. 1 and 2.

Method 400 begins at block 410 where a request is received at a server device. The request is to access content on a first application executed on a client device. At block 420, it is determined that the first application (executing on the client device) is in an unrestricted state with respect to the application, where the determination is based on an ephermal state machine of the server device. In one implementation, the ephermal state machine may compare a current time against a start and end time of a trial subscription to identify whether the first application is within the trial subscription period. Subsequently, at block 430, an install state of a second application on the client device is determined. In one implementation, the client device may transmit information regarding whether the second application is installed on the client device.

At decision block 440, it is determined whether an install state of the second application on the client device is equal to uninstalled. If so, then method 400 proceeds to block 450, where the content is provided via the first application in an unrestricted state. In one implementation, the unrestricted state refers to unlimited access to premium services of the first application. If, at decision block 440, it is determined that the install state of the second application does not equal uninstalled (i.e., the install state of the second application is installed), then method 400 proceeds to block 460. At block 460, the first application is transferred to a restricted state. Subsequently, at block 470, the content is provided via the first application in the restricted state. In one implementation, the restricted state refers to access to non-premium services of the first application.

Figure 5:
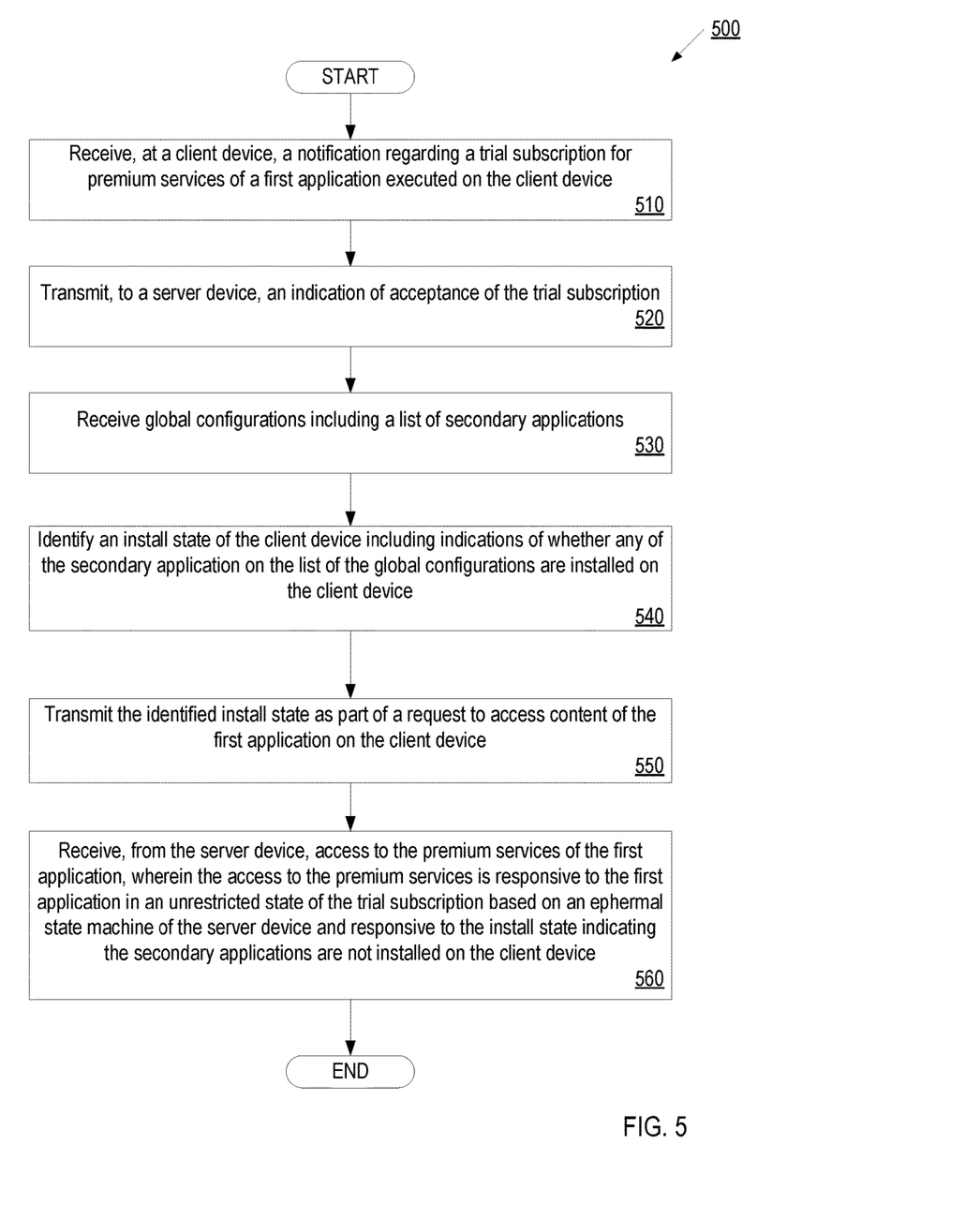
FIG. 5 is a flow diagram illustrating another method for facilitating changing of subscription services, according to an implementation.

FIG. 5 is a flow diagram illustrating another method 500 for facilitating changing of subscription services, according to some implementations of the disclosure. The method 500 may be performed by processing logic that comprises hardware (e.g., circuitry, dedicated logic, programmable logic, microcode, etc.), software (e.g., instructions run on a processing device to perform hardware simulation), or a combination thereof. In one implementation, method 500 may be performed by application state component 115 as shown in FIGS. 1 and 2.

Method 500 begins at block 510 where a notification regarding a trial subscription is received at a client device. The trial subscription may relate to premium services of a first application executed on the client device. In one implementation, the notification is the same as UI 300 described with respect to FIG. 3. At block 520, an indication of acceptance of the trial subscription is transmitted to a server device associated with the first application. At block 530, global configurations are received, where the global configurations include a list of secondary applications. In one implementation, the global configurations are received from the server device.

Subsequently, at block 540, an install state of the client device is identified. The install state may include indications of whether any of the secondary application on the list of the global configurations are installed on the client device. At block 550, the identified install state is transmitted to the server device as part of a request to access content of the first application on the client device. Lastly, at block 560, access to the premium services of the first application is received from the server device. The access to the premium services may be provided responsive to the first application being in an unrestricted state of the trial subscription based on ephermal state machine of the server device and responsive to the install state indicating the secondary applications are not installed on the client device.

Figure 6:
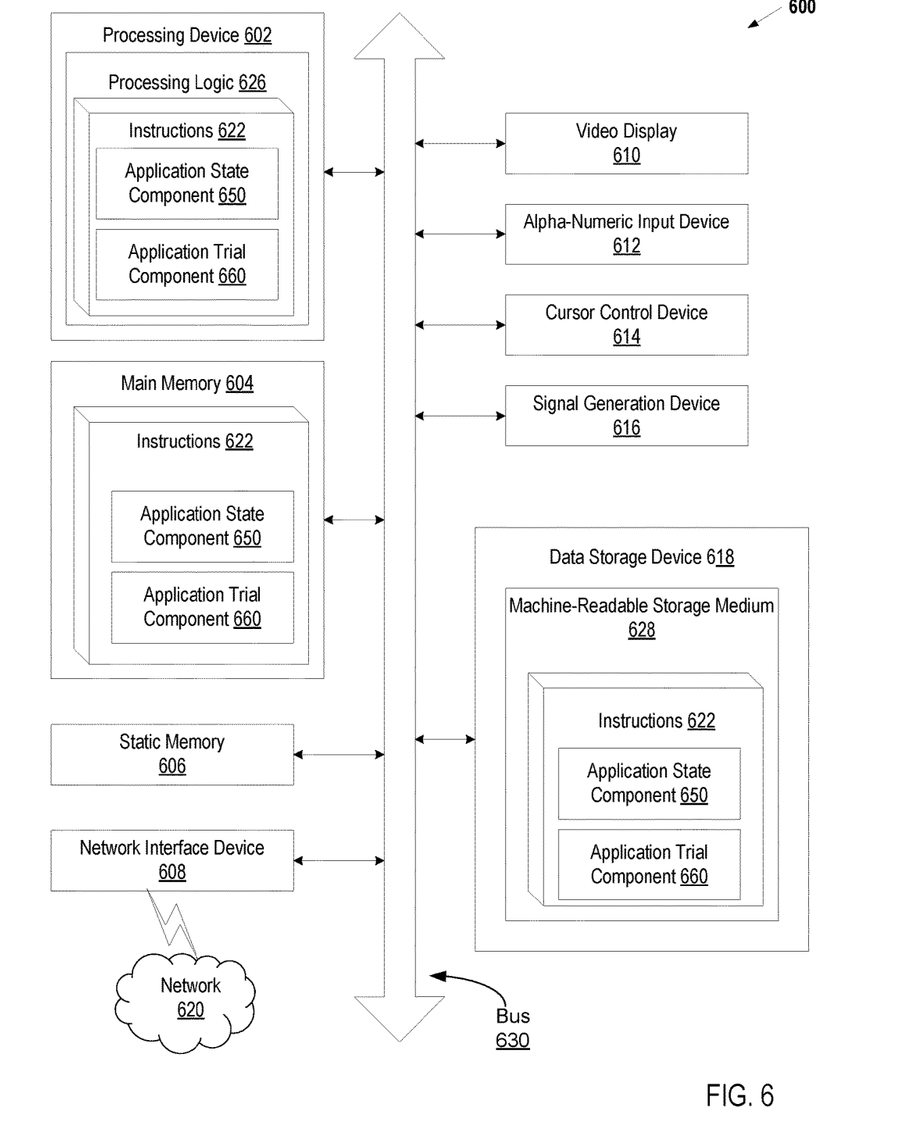
FIG. 6 is a block diagram illustrating one implementation of a computer system, according to an implementation.

FIG. 6 illustrates a diagrammatic representation of a machine in the exemplary form of a computer system 600 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 600 may be representative of a server (such as server 102) or client (such as client 110A-110Z) executing an application state component 650, such as application state component 115, and/or executing an application trial component 660, such as application trial component 140, as described with respect to FIGS. 1 and 2.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 602 is configured to execute processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable storage medium 628 (also referred to as a machine-readable storage medium), on which is stored one or more set of instructions 622 (e.g., software) embodying any one or more of the methodologies of functions described herein. The instructions 622 may also reside, completely or at least partially, within the main memory 604 and/or within the processing device 602 during execution thereof by the computer system 600; the main memory 604 and the processing device 602 also constituting machine-readable storage media. The instructions 622 may further be transmitted or received over a network 620 via the network interface device 608.

The computer-readable storage medium 628 may also be used to store instructions to perform a method for facilitating changing of subscription services, as described herein. While the computer-readable storage medium 628 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

What is claimed is:

1. A method comprising:
   receiving, by a processing device of a server device of a first content platform, a request to access content via a first application executing on a client device, the first application being associated with the first content platform;
   determining that the first application is in an unrestricted state based on an ephermal state machine of the server device;
   determining an install state of a second application on the client device, the second application being associated with a second content platform;
   responsive to determining that the install state of the second application is uninstalled, providing the content via the first application in the unrestricted state; and
   responsive to determining that the install state of the second application is installed, transferring the first application to a restricted state, and providing the content via the first application in the restricted state.

2. The method of claim 1, wherein the unrestricted state comprises an extended free trial period.

3. The method of claim 1, wherein the unrestricted state comprises a free trial period.

4. The method of claim 1, wherein the ephermal state machine determines that the first application is in the unrestricted state based on a comparison of a start time and an end time of a trial subscription with a current time of the request.

5. The method of claim 4, wherein the start time and the end time of the trial subscription are configured in a trial description object.

6. The method of claim 1, wherein the install state of the second application is provided by the client device to the server device based on a list of secondary applications provided to the client device.

7. The method of claim 6, wherein the list of secondary applications is configured in a trial description object.

8. The method of claim 6, wherein the install state is based on assessing a capability of the client device to handle Uniform Resource Locator (URL) schemes associated with the list of secondary applications.

9. The method of claim 6, wherein the install state is based on assessing application intents of the client device with respect to the list of secondary applications.

10. The method of claim 1, wherein the unrestricted state comprises access to premium services of the first application, and wherein the restricted state comprises denial of access to the premium services of the first application.

11. A client device comprising:
    a memory; and
    a processing device coupled to the memory, wherein the processing device is to:

receive a notification regarding a trial subscription for premium services of a first application executed on the client device;

transmit, to a server device associated with the first application, an indication of acceptance of the trial subscription;

receive, from the server device, information identifying a set of secondary applications;

identify an install state of the client device, the install state indicating whether any of the secondary applications from the set of secondary applications are installed on the client device;

transmit, to the server device, the identified install state as part of a request to access content of the first application on the client device; and receive, from the server device, access to the premium services of the first application, the access to the premium services provided responsive to the first application of the client device being in an unrestricted state of the trial subscription and responsive to the install state indicating the secondary applications are not installed on the client device.

12. The client device of claim 11, wherein the unrestricted state comprises at least one of an extended free trial period or a free trial period.

13. The client device of claim 11, wherein the first application is determined to be in the unrestricted state based on a comparison of a start time and an end time of a trial subscription with a current time of the request.

14. The client device of claim 13, wherein the start time and the end time of the trial subscription are configured in a trial description object.

15. The client device of claim 11, wherein the set of secondary applications is configured in a trial description object of the server device.

16. The client device of claim 11, wherein the install state is based on assessing a capability of the client device to handle Uniform Resource Locator (URL) schemes associated with the set of secondary applications.

17. The client device of claim 11, wherein the install state is based on assessing application intents of the client device with respect to the set of secondary applications.

18. A non-transitory machine-readable storage medium storing instructions which, when executed, cause a processing device to perform operations comprising:

receiving, by a processing device of a server device of a first content sharing platform, a request to access content via a first application executing on a client device, the first application being associated with the first content platform;

determining that the first application is in an unrestricted state based on an ephermal state machine of the server device;

determining an install state of a second application on the client device, the second application being associated with a second content platform;

responsive to determining that the install state of the second application is uninstalled, providing the content via the first application in the unrestricted state; and responsive to determining that the install state of the second application is installed, transferring the first application to a restricted state, and providing the content via the first application in the restricted state.

19. The non-transitory machine-readable storage medium of claim 18, wherein the ephermal state machine determines that the first application is in the unrestricted state based on a comparison of a start time and an end time of a trial subscription with a current time of the request.

20. The non-transitory machine-readable storage medium of claim 19, wherein the start time and the end time of the trial subscription are configured in a trial description object.

21. The non-transitory machine-readable storage medium of claim 18, wherein the install state of the second application is provided by the client device to the server device based on a list of secondary applications provided to the client device.

22. The non-transitory machine-readable storage medium of claim 21, wherein the list of secondary applications is configured in a trial description object.

23. The non-transitory machine-readable storage medium of claim 21, wherein the install state is based on assessing a capability of the client device to handle Uniform Resource Locator (URL) schemes associated with the list of secondary applications.

24. The non-transitory machine-readable storage medium of claim 21, wherein the install state is based on assessing application intents of the client device with respect to the list of secondary applications.

\* \* \* \* \*